United States Patent
Krakovszki

(10) Patent No.: US 12,069,141 B2
(45) Date of Patent: Aug. 20, 2024

(54) METHOD FOR COUPLING AND COUPLING UP A SENSOR, AND COMMUNICATION NETWORK

(71) Applicant: Robert Bosch GmbH, Stuttgart (DE)

(72) Inventor: Arpad Krakovszki, Untereisesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/003,993

(22) PCT Filed: Jul. 21, 2021

(86) PCT No.: PCT/EP2021/070374
§ 371 (c)(1),
(2) Date: Dec. 30, 2022

(87) PCT Pub. No.: WO2022/018131
PCT Pub. Date: Jan. 27, 2022

(65) Prior Publication Data
US 2023/0283680 A1    Sep. 7, 2023

(30) Foreign Application Priority Data

Jul. 22, 2020  (DE) ..................... 10 2020 209 221.4

(51) Int. Cl.
*H04L 67/00* (2022.01)
*H04L 12/40* (2006.01)
*H04L 67/12* (2022.01)

(52) U.S. Cl.
CPC .......... *H04L 67/34* (2013.01); *H04L 12/4015* (2013.01); *H04L 67/12* (2013.01); *H04L 2012/40273* (2013.01)

(58) Field of Classification Search
CPC . H04L 67/12; H04L 41/0803; H04L 41/0806; H04L 41/0813; H04L 41/0823;
(Continued)

(56) References Cited

U.S. PATENT DOCUMENTS

| 10,531,075 B1 * | 1/2020 | Dariush ................... G01S 17/86 |
| 11,665,055 B2 * | 5/2023 | Krieger ............... H04L 12/1881 |
| | | 709/220 |

(Continued)

OTHER PUBLICATIONS

International Search Report corresponding to PCT Application No. PCT/EP2021/070374, mailed Oct. 21, 2021 (German and English language document) (7 pages).

(Continued)

*Primary Examiner* — Kostas J Katsikis
(74) *Attorney, Agent, or Firm* — Maginot, Moore & Beck LLP

(57) ABSTRACT

A communication network for a vehicle includes a control device, a network switch and at least one sensor. The control device transmits at least one service provision message for configuring a sensor to a control interface of the network switch. The network switch outputs the service provision message at a sensor interface of the network switch that is associated with the service provision message. The sensor transmits at least one service search query to the sensor interface of the network switch, receives the service provision message from the sensor interface, and teaches a configuration by using the service provision message.

16 Claims, 7 Drawing Sheets

(58) Field of Classification Search
CPC .................... H04L 67/34; H04L 12/40; H04L 2012/40273
See application file for complete search history.

(56) References Cited

U.S. PATENT DOCUMENTS

| | | | | |
|---|---|---|---|---|
| 2013/0201013 | A1* | 8/2013 | Schoenberg | B60N 2/2869 |
| | | | | 340/438 |
| 2017/0033986 | A1* | 2/2017 | Anderson | H04L 12/4625 |
| 2017/0250961 | A1* | 8/2017 | Rasbornig | H04L 9/0819 |
| 2019/0248193 | A1* | 8/2019 | Scheibenzuber | B60C 23/0471 |
| 2019/0378355 | A1* | 12/2019 | Bruneel, II | H04W 4/40 |
| 2020/0065665 | A1* | 2/2020 | Nageshrao | G06N 3/08 |
| 2020/0213195 | A1* | 7/2020 | Krieger | H04L 41/0813 |
| 2020/0213820 | A1 | 7/2020 | Sim | |
| 2021/0215505 | A1* | 7/2021 | Castorena Martinez | |
| | | | | G01D 18/00 |

OTHER PUBLICATIONS

Völker, L., "Communication Protocols for Ethernet in the Vehicle: Automotive Bus Systems and Ethernet", Dec. 9, 2013, Retrieved from the Internet: https://www.iqpc.com/media/9048/29408.pdf (21 pages).

Intrepid Control Systems, "SOME/IP—A Service Oriented Architecture (Intrepid Tech Day '19)," Sep. 4, 2019, Retrieved from the Internet: https://www.youtube.com/watch?v=T0K9oGaZJoY, 09:34-10:42, screen capture at 9:34.

\* cited by examiner

METHOD FOR COUPLING AND COUPLING UP A SENSOR, AND COMMUNICATION NETWORK

This application is a 35 U.S.C. § 371 National Stage Application of PCT/EP2021/070374, filed on Jul. 21, 2021, which claims the benefit of priority to Serial No. DE 10 2020 209 221.4, filed on Jul. 22, 2020 in Germany, the disclosures of which are incorporated herein by reference in their entirety.

The disclosure is based on a device or a method for coupling and coupling up a sensor. The present disclosure also relates to a computer program.

In the automotive industry, many sensors are installed directly in the vehicle at the end of the belt by the vehicle manufacturer. In most cases, a plurality of sensors of the same type of type/design (e.g., a plurality of radars) are installed at the same time, which sensors have to be individually taught by a coding process at the end of the belt, due to their different position and/or functional parameters. The sensors are generally connected directly to the same control unit via separate connections. The sensor can always be unambiguously identified and then coded/taught by means of the cabling on the control unit or by means of pin coding at the connection cable of the sensors. The teaching usually takes place simply via the pin coding on the cable or via tester intervention, in that the control unit is requested to communicate/teach the connected sensors their coding.

SUMMARY

Against this background, the approach presented here provides methods for coupling and coupling up a sensor, and a communication network, and finally a corresponding computer program. Advantageous developments and improvements of the device are made possible by the measures set forth herein.

In a communication network for a vehicle, a configuration of a sensor can advantageously be carried out using a predetermined communication sequence between the sensor, a control device and a network switch connected between the sensor and the control device.

A method for coupling a sensor for a vehicle to a control device via a network switch comprises the following steps:

transmitting at least one service search query to a sensor interface of the network switch;

receiving a service provision message from the sensor interface of the network switch, the service provision message representing a message provided by the control device to a control interface of the network switch for configuring the sensor;

teaching a configuration of the sensor by using the service provision message; and providing the sensor interface of the network switch with a subscription message that confirms the configuration.

The steps of the coupling method may be performed by using suitable devices of the sensor.

The vehicle can be a vehicle for passenger transport, for example a passenger car, or a truck. The vehicle can have a communication network which comprises at least one control device and at least one sensor which are or can be connected via a network switch. Typically, a plurality of sensors of the same or different types can be integrated into the communication network. A sensor can be a sensor that is typically installed in vehicles; merely by way of example an environment sensor, an acceleration sensor or a rotational speed sensor are cited. If the sensor is not yet configured or is configured incorrectly, the sensor may be configured by using the control device. After such a configuration, the sensor can be operated, for example, in a sensor mode in which the sensor can detect, for example, a physical quantity, and provide a sensor signal representing the physical quantity. The sensor can be designed to transmit one or more service search queries. By means of the service search query, the control device can be prompted to transmit the service provision message, which can be used by the sensor for learning a configuration provided for the sensor. For this purpose, the service provision message can comprise corresponding configuration data for configuring the sensor. Thus, for example, a sensor that is not yet configured can initiate its own configuration by transmitting the service search query. After teaching, the sensor may be ready to operate in a sensor mode, for example. The control device can be informed of a successfully executed configuration, and thus the readiness of the sensor, by the subscription message.

According to one embodiment, the method comprises a checking step. In this case, the sensor can check whether a configuration of the sensor is present. If it is detected that there is no configuration present, the transmission step can be performed. For example, the checking step can be performed after a start-up of the sensor. If it is detected, in this case, that no configuration has yet been executed, this can be initiated immediately.

In contrast, if it is detected that a configuration is present, a loading step can be performed in which the configuration can be loaded. As a result, the sensor can be set, for example, into a sensor mode. Optionally, at least one service search query can be transmitted in a transmission step. As a result, the control device can be prompted, as already set out, to transmit a service provision message. This allows the sensor to check whether the loaded configuration corresponds to the configuration provided by the control device for this sensor.

To this end, a step of receiving a service provision message after performing the step of transmitting the service search query can be performed. A step of providing a subscription message that confirms the configuration may be performed if the existing configuration corresponds to a configuration defined by the service provision message. Otherwise, a step of teaching a configuration of the sensor can be carried out by using the service provision message. In this way, the existing configuration of the sensor can be replaced by a new configuration which is currently provided for the sensor by the control device.

If the sensor has different configuration options, a plurality of service search queries associated with the different configuration options can be transmitted in the transmission step. As a result, the control device can be prompted to transmit service provision messages provided for all these different configuration options. Advantageously, the network switch can be used to allow the service provision message intended for the sensor to pass through at the sensor interface, from the service provision messages sent by the control device, and to filter out the other service provision messages.

A corresponding method for coupling up a sensor for a vehicle to a control device via a network switch comprises the following steps:

transmitting at least one service provision message from the control device to a control interface of the network switch, the service provision message representing a message for configuring the sensor; and outputting the service provision message at a sensor interface of the network switch that is associated with the service provision message.

The steps of the method for coupling up can be carried out by using devices of the control device and the network switch.

The control device can be, for example, a control unit, as is customary in the vehicle sector. The control device can comprise at least one device for performing the transmission step, and optionally further devices for performing further steps. The network switch can also be referred to as a switch. The network switch can be designed in one part or in multiple parts, i.e., for example may also comprise a plurality of switches. The network switch can comprise at least one device for performing the outputting step, and optionally further devices for performing further steps. The network switch can be designed to forward the service provision message, sent by the control device, to the sensor. In this case, the network switch can have a filter functionality which can ensure that only the service provision message provided for this sensor is forwarded to this sensor. Other service provision messages that are not provided for this sensor can, in contrast, be filtered out.

The step of transmitting the service provision message can be carried out in response to a start-up of the control device. As a result, a configuration of the sensor can be initiated during the start-up, or an existing configuration can be checked with regard to its currentness.

Additionally or alternatively, the step of transmitting the service provision message can be performed in response to reading in a service search query. In this way, for example a sensor newly integrated into the communication network can be configured.

The method may comprise a step of returning a subscription message that confirms a configuration of the sensor from the sensor interface to the control interface of the network switch. As a result, the control device can be informed about a successful configuration of the sensor.

In the outputting step, the sensor interface can be selected from a plurality of sensor interfaces by using the service provision message. This is advantageous if the communication network comprises a plurality of sensors. In this case, it is important that, for each of the sensors, only the service provision message intended for said sensor is made available. For example, the sensor interface can be selected based on a filtering of what is known as a frame of the service provision message. If the frame is not filtered out at a sensor interface during the filtering, the service provision message can be output via this sensor interface. If, in contrast, the frame is filtered out, an output of the service provision message via this sensor interface can be blocked. In this case, each sensor interface can be assigned its own filter rule, which can differ from the filter rules of the other sensor interfaces. According to one embodiment, the method comprises a step of setting corresponding filter rules, also filter criteria, at the sensor interfaces of the network switch. In the case of an Ethernet network, this can take place via what is known as an Ethernet switch port configuration.

In this case, a plurality of service provision messages associated with different sensor variants can be sent in the transmission step. Using the network switch can ensure that the different service provision messages are made available to the provided sensors.

A corresponding communication network for a vehicle comprises a control device, a network switch and at least one sensor. The control device is designed to transmit at least one service provision message to a control interface of the network switch, the service provision message representing a message for configuring a sensor. The network switch is designed to guide the service provision message from the control interface to at least one sensor interface of the network switch that is associated with the service provision message, and to output it at the sensor interface that is associated with the service provision message. The sensor is designed to transmit at least one service search query to the sensor interface of the network switch, to receive the service provision message from the sensor interface, to teach a configuration of the sensor by using the service provision message, and to provide a subscription message that confirms the configuration to the sensor interface of the network switch.

The sensor can be designed to sense a physical quantity after teaching the configuration, and to provide a sensor signal representing the physical quantity. The control device and/or optionally a further control device of the communication network can be designed to receive the sensor signal and to control a vehicle function of the vehicle by using the sensor signal. The control device can thus be used, for example, exclusively for configuring the sensor or sensors, and the further control device can be used for normal sensor operation of the sensor or sensors.

The communication network can be designed as an Ethernet network. Thus, known communication protocols can be used. Thus, the described approach can be used to teach Ethernet sensors, for example by means of what is known as Some/IP communication (Scalable Service-Oriented Middleware over IP) and a suitable switch configuration of the network switch.

The stated method can be implemented, for example, in software or hardware, or in a mixed form of software and hardware.

The sensor, the network switch and/or the control device can have at least one computing unit for processing signals or data, at least one memory unit for storing signals or data, at least one interface for reading in electrical signals and for outputting electrical signals to the actuator, and/or at least one communication interface for reading in or outputting data embedded in a communication protocol. The computing unit can be, for example, a signal processor, a microcontroller or the like, it being possible for the memory unit to be a flash memory, an EEPROM or a magnetic memory unit. The communication interface can be designed to read in or output data in a wireless and/or wired manner, a communication interface, which can read in or output linebound data, being able to read in these data, for example electrically or optically, from a corresponding data transmission line, or being able to output these data into a corresponding data transmission line.

A computer program product or a computer program comprising program code that can be stored on a machine-readable carrier or storage medium, such as a semiconductor memory, a hard disk memory, or an optical memory, and that is used for carrying out, implementing, and/or actuating the steps of a method according to one of the embodiments described above is also advantageous, in particular when the program product or program is executed on a computer or an apparatus.

BRIEF DESCRIPTION OF DRAWINGS

Embodiments of the approach presented here are illustrated in the drawings and explained in more detail in the following description. In the drawings.

DETAILED DESCRIPTION

In the following description of advantageous embodiments of the present disclosure, the same or similar reference signs are used for the elements shown in the various figures and acting similarly, as a result of which a repeated description of these elements is omitted.

Figure 1:
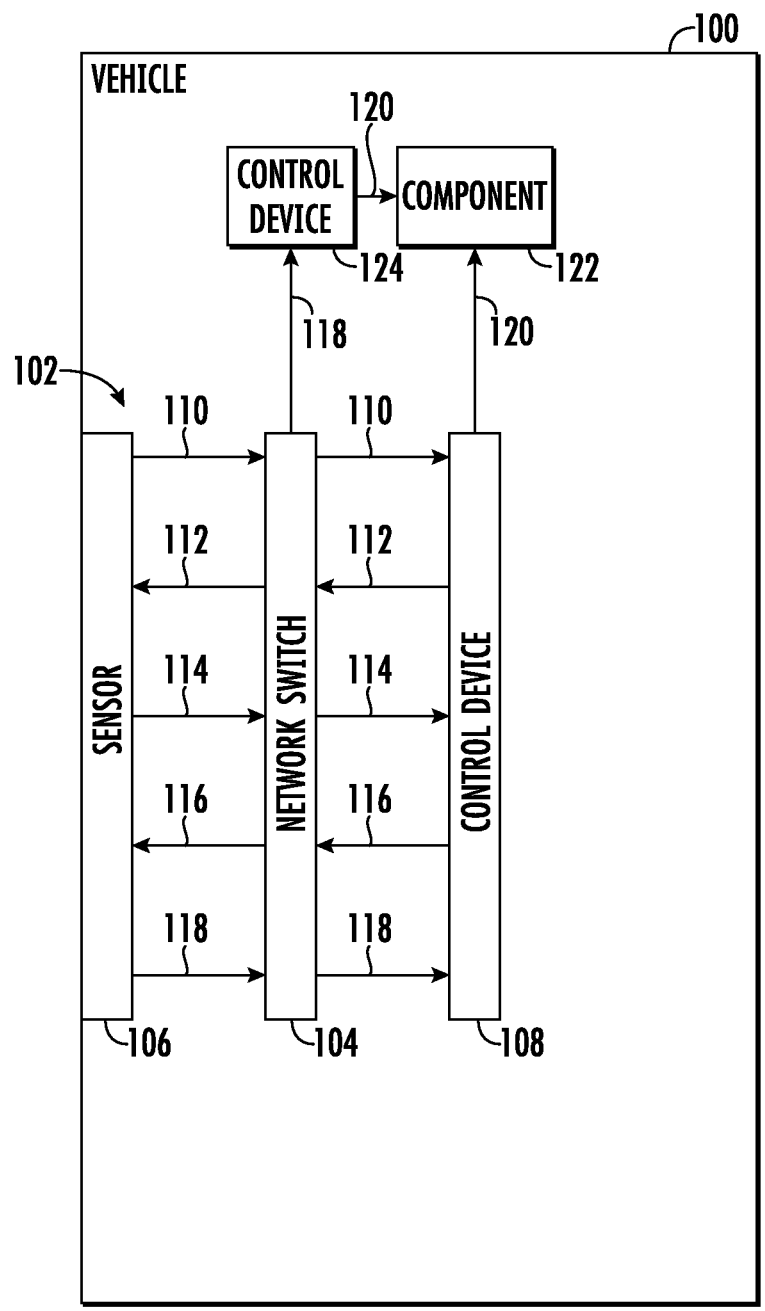
FIG. 1 is a schematic view of a vehicle comprising a communication network according to one embodiment.

FIG. 1 is a schematic view of a vehicle 100 comprising a communication network 102 according to one embodiment. The vehicle 100 is, for example, a passenger car, and the communication network 102 is a network for connecting electronic components of the vehicle 100. The communication network 102 comprises at least one network switch 104, via which the components of the communication network 102 are coupled to one another. According to this embodiment, a sensor 106 and a control device 108 are coupled to one another via the network switch 104. In this case, the sensor 106 is connected by a sensor interface, for example in the form of a port, and the control device 108 is connected by a control interface, for example in the form of a further port, to the network switch 104. Electrical signals, for example in the form of data packets, can be transmitted via the network switch 104. Merely by way of example, the communication network 102 is designed as an Ethernet network.

The sensor 106 is designed to be configurable. Merely by way of example, a measurement range of the sensor 106 can be set via a configuration of the sensor 106. If the sensor 106 is, for example, coupled to the communication network 102 for the first time, initial configuration or reconfiguration of the sensor 106 is required.

According to this embodiment, the sensor 106 is designed to transmit a service search query 110 via the network switch 104 to the control device 108, for example after a start-up. The service search query 110 displays a configuration option of the sensor 106. If the sensor 106 comprises further configuration options, the sensor 106 is designed, according to one embodiment, to transmit further service search queries associated with the further configuration options.

The control device 108 is designed to transmit a service provision message 112 to the network switch 104. The service provision message 112 is suitable for configuring a sensor connected to the network switch 104, such as the sensor 106. If the control device 108 transmits the service provision message 112 in response to receipt of the service search query 110, the service provision message 112 is suitable for configuring a sensor according to the configuration option indicated by the service search query 110.

The network switch 104 is designed to output the service provision message 112 only to one or more predetermined sensor interfaces. For example, the network switch 104 is designed to select one or more sensor interfaces by using information contained in the service provision message 112 and a selection rule, also called a filter rule or filter criterion, stored in the network switch 104. According to this embodiment, the network switch 104 is designed to forward the service provision message 112 exclusively to the sensor 106. For this purpose, the network switch 104 according to one embodiment has sensor interfaces having adjustable filter rules.

The sensor 106 is designed to receive the service provision message 112 and to use it for teaching the configuration predetermined by the service provision message 112. After the configuration has been completed, the sensor 106 is designed to provide a subscription message 114 that confirms the configuration to the control device 108 via the network switch 104.

Optionally, the control device 108 is designed to transmit a confirmation message 116 to the sensor 106 via the network switch 104 in response to receipt of the subscription message 114.

After successful configuration of the sensor 106, said sensor is suitable for sensor operation, i.e., can for example detect a physical quantity and provide a sensor signal 118 representing the physical quantity.

For example, the control device 108 is designed to provide a control signal 120 for controlling a function of a vehicle component 122, for example a drive or an assistance system of the vehicle 100, by using the sensor signal 118 and a control rule.

According to one embodiment, the control device 108 is used only to configure the sensor 106 and possibly further sensors. An optional further control device 124 is connected to the network switch 104 via a further control interface of the network switch 104. In this case, the further control device 124 is designed alternatively to the control device 106 in order to provide the control signal 120 to the vehicle component 122 by using the sensor signal 118.

Figure 2:
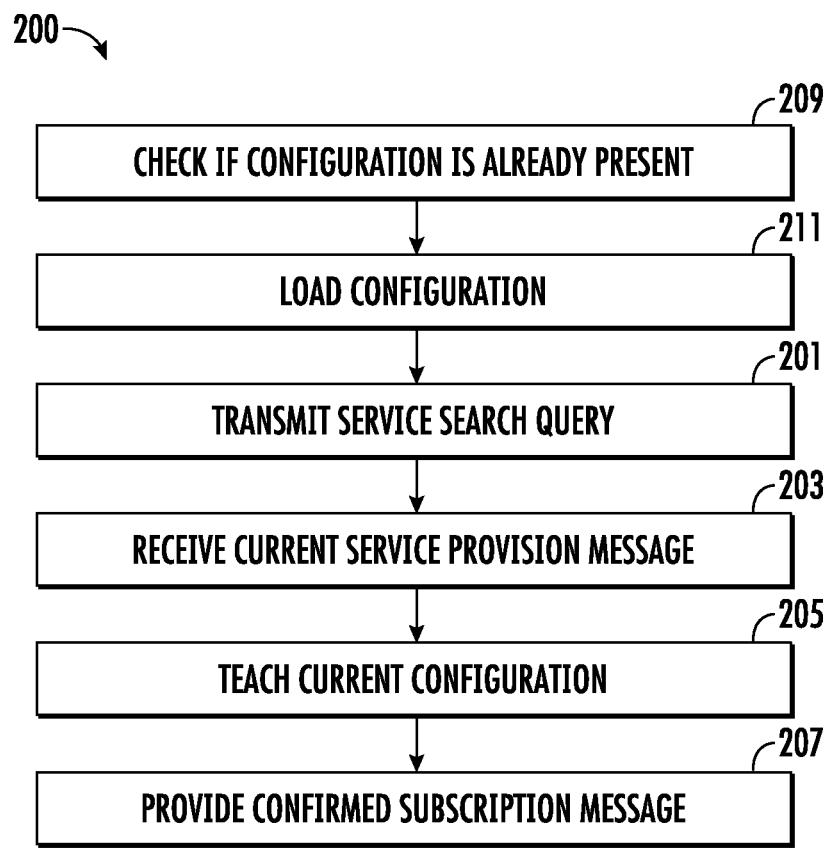
FIG. 2 is a flow chart of a method for coupling a sensor for a vehicle according to one embodiment.

FIG. 2 is a flow chart of a method 200 for coupling a sensor for a vehicle according to one embodiment. For example, the method 200 is carried out in order to configure the sensor shown in FIG. 1. In this case, the method 200 can be carried out by using devices of the sensor.

In a step 201, the sensor transmits at least one service search query. In a step 203, the sensor receives a service provision message. In a step 205, the sensor teaches a configuration by using the service provision message. In a step 207, the sensor provides a subscription message that confirms the configuration.

Optionally, the method comprises a step 209 in which the sensor checks whether a configuration is already present, the step 201 of transmitting the service search query being performed when the step 209 indicates that there is no configuration present. On the other hand, if step 209 reveals that a configuration is present, the already present configuration is loaded according to configuration in a step 211.

Optionally, the step 201 of transmitting the service search query is nevertheless performed in order to prompt the control device to transmit a current service provision message. It can be checked whether the present configuration is still current. For this purpose, the current service provision message is received in step 203. If the present configuration of the sensor corresponds to the current service provision message, the confirmed subscription message is provided in step 207. By contrast, if the present configuration of the sensor does not correspond to the current service provision message, step 205 is carried out in order to teach a current configuration by using the current service provision message. This is optionally confirmed in step 207 by a corresponding subscription message.

If the sensor comprises a plurality of different configuration options, a plurality of different service search queries is transmitted in step 201, or step 201 is carried out repeatedly, according to the number of different configuration options in order to transmit a corresponding service search query for each of the configuration options.

Figure 3:
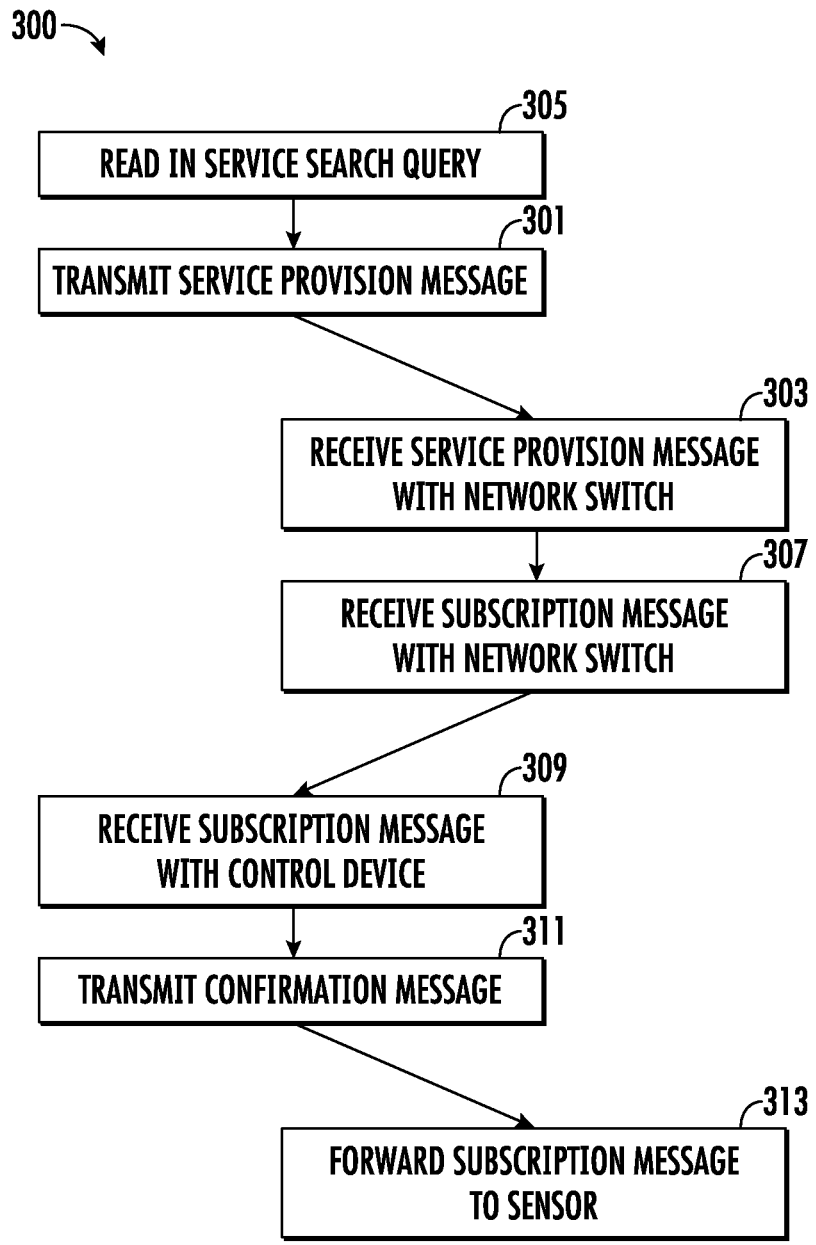
FIG. 3 is a flow chart of a method for coupling up a sensor for a vehicle according to one embodiment.

FIG. 3 is a flow chart of a method 300 for coupling up a sensor for a vehicle according to one embodiment. For example, the method 300 is carried out in order to configure the sensor shown in FIG. 1 by using the control device via the network switch. In this case, the method 300 can be carried out by using devices of the network switch and the control device. The method 300 can be carried out in conjunction with the method for coupling described with reference to FIG. 2.

In a step 301, at least one service provision message is sent by the control device. In a step 303, the service provision message is received by the network switch via a control interface connected to the control device, and is output at a sensor interface of the network switch that is associated with the service provision message. In this case, the sensor is connected to the sensor interface. In step 303, according to one embodiment, the sensor interface is selected from a plurality of sensor interfaces of the network switch by using the service provision message. For this purpose, for example a frame of the service provision message is subjected to filtering at each sensor interface. If the service provision message is filtered out at a sensor interface, it is not output at this sensor interface. If the service provision message is not filtered out at a sensor interface, it is output at this sensor interface. For filtering, suitable filter rules for the individual sensor interfaces can be predetermined in the network switch or set in an adjustment step.

The step 301 of transmitting the service provision message is performed, for example, after a start-up of the control device or in response to a service search query which is read in, for example, in a step 305.

Optionally, the network switch is designed to receive a subscription message at the sensor interface in a step 307 and to return it to the control interface. The control device is designed to receive the subscription message in a step 309 and, optionally, to transmit a confirmation message in a step 311, and forward it from the network switch to the sensor in a step 313.

If a plurality of sensors are to be configured, which are present in different sensor variants, a plurality of service provision messages associated with different sensor variants are transmitted in step 301, or step 301 is carried out repeatedly according to the number of different sensor variants, in order to transmit a corresponding service provision message for each of the sensor variants.

Figure 4:
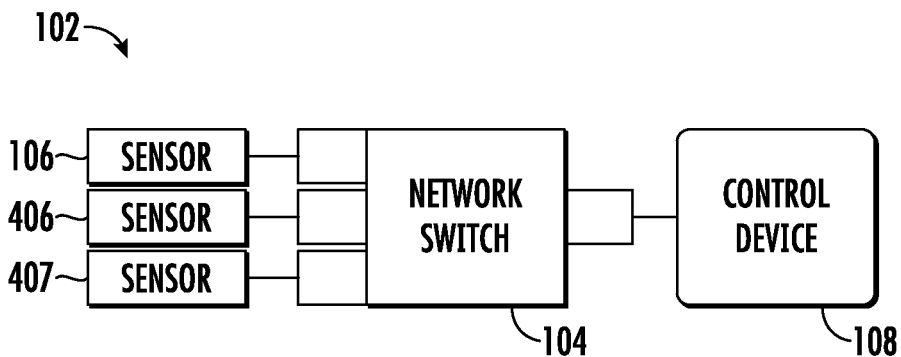
FIG. 4 is a block diagram of a communication network according to one embodiment.

FIG. 4 is a block diagram of a communication network 102 according to one embodiment. This can be an embodiment of the communication network described with reference to FIG. 1.

The communication network 102 comprises a network switch 104, a control device 108, a first sensor 106, a second sensor 406 and a third sensor 407. The number of sensors 106, 406, 407 is selected only by way of example. The network switch 104 is designed as an Ethernet switch, and the control device 108 is designed as a control unit. The network switch 104 has a control interface via which the control device 108 is connected to the network switch 104. The control interface is also referred to as a port 4. Furthermore, the network switch 104 has a first sensor interface, for example a port 1, via which the first sensor 106 is connected to the network switch 104, a second sensor interface, for example a port 2, via which the second sensor 406 is connected to the network switch 104, and a third sensor interface, for example a port 3, via which the third sensor 407 is connected to the network switch 104.

In modern systems, sensors 106, 406, 407 which are connected via Ethernet are increasingly used. These "Ethernet sensors" do not necessarily have to be connected directly to the control unit, here the control device 108, but can also be connected to the control device 108 via an Ethernet switch, in this case the network switch 104, as determined by the Ethernet bus topology. In this case, the sensors 106, 406, 407 cannot be identified and taught via pin coding or via the connections of the control device 108.

Instead, teaching one of, a plurality of or all of the sensors 106, 406, 407, which are connected to the control device 108 via the network switch 104, takes place via the network switch 104.

Advantageously, the sensors 106, 406, 407, which are connected to the control device 108 via the network switch 104, do not require any pin coding or other identification measures by means of HW measures in order to be able to learn. The sensors 106, 406, 407 learn only by establishing a successful communication to the control device 108. The sensors 106, 406, 407 learn their configuration, for example their position and/or coding, via special messages, which are sent by the specific control device 108 in the network at the start or upon request and/or as required in accordance with the Some/IP communication standard according to this embodiment. A tester intervention is therefore also not necessary. Any control unit in the network can assume this function, provided that it is accessibly connected in the communication network 102; it does not necessarily have to be the control unit which has to communicate later with the sensor(s) 106, 406, 407. If a sensor 106, 406, 407 is to be replaced, for example in the workshop, the sensor 106, 406, 407 can be replaced easily and the sensor 106, 406, 407 is subsequently taught. A further advantage is that an absence or incorrect connection of a sensor 106, 406, 407 can be recognized immediately, since this information is always present in the control unit, i.e., in this case the control device 108, which carries out the teaching.

Figure 5:
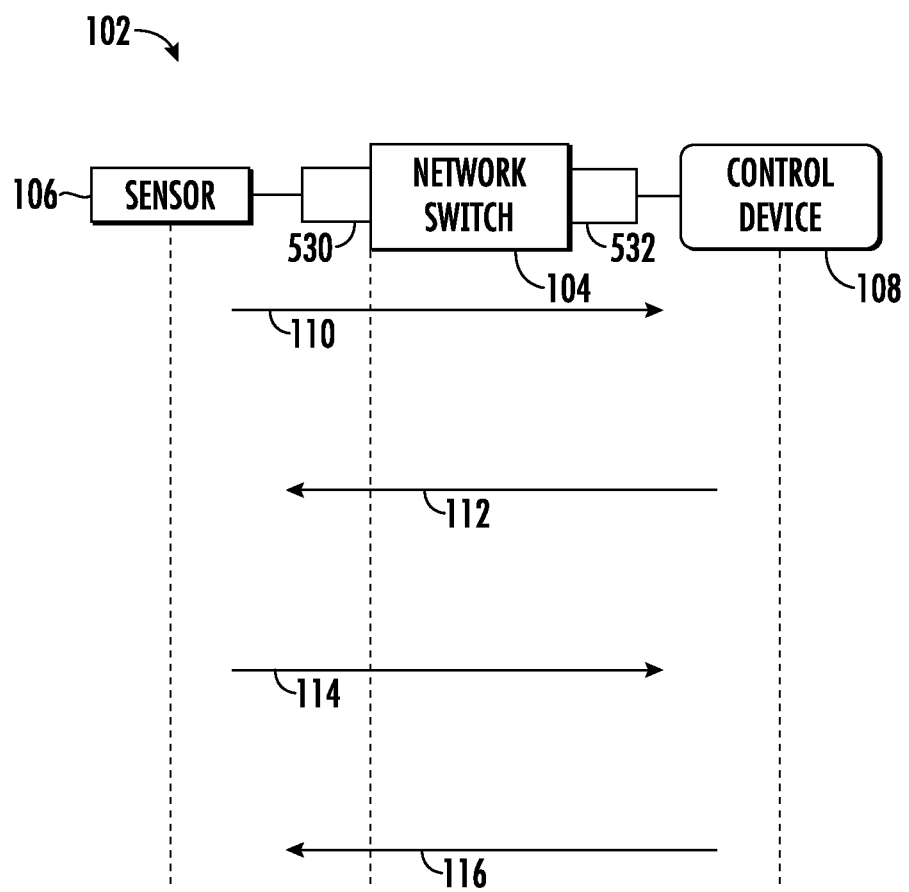
FIG. 5 is a block diagram of a communication network according to one embodiment.

FIG. 5 is a block diagram of a communication network 102 according to one embodiment. This can be an embodiment of the communication network described with reference to FIG. 1.

The communication network 102 comprises the sensor 106, the network switch 104 and the control device 108. The network switch 104 has a sensor interface 530, for example a port 1, via which the network switch 104 communicates with the sensor 106. Furthermore, the network switch 104 has a control interface 532, for example a port 0, via which the network switch 104 communicates with the control device 108. The network switch 104 is in turn designed as a switch, and the control device 108 as a control unit.

A communication principle with the sensor 106 comprises a service search query 110, which is also referred to as Find Service "Var_1", a service provision message 112, which is also referred to as Offer Service "Var_1", a subscription message 114, which is also referred to as Subscribe Service "Var_1", and a confirmation message 116, which is also referred to as a Subscribe Ack. "Var_1" is denoted for service. The transmission of the messages 110, 112, 114, 116 takes place, for example, according to the Some/IP communication protocol.

According to one embodiment, the communication between the sensor 106 and the teaching control device 108, in this case the control unit, which carries out the teaching and registering of the sensor 106, and optionally further sensors, takes place in a service-oriented manner according to the Service Discovery in the Some/IP standard.

With reference to FIG. 5, the communication is explained in the following with only the sensor 106 to be taught.

In the case of the Some/IP communication standard, the communication setup is carried out by means of Service Discovery (SD). In this case, the control device 108 acts as a server, and the sensor 106 acts as a client. After the start, the client cyclically transmits "Find Service" MultiCast messages, such as the service search query 110, into the network in order to thereby search for a specific service in the network, which the control device 108 provides according to this embodiment. The control device 108 as a server also transmits "Offer Service" MultiCast messages, such as the service provision message 112, into the network at least 3 times after the start in order to disclose its service offer to the other network subscribers, and then also, if necessary, in response to a "Find Service" message, such as the service search query 110. If the sensor 106 receives an "Offer Service" message, such as the service provision message 112, the sensor 106 can learn on the basis of this and subscribe to this service immediately ("Subscribe Service"). The subscription is confirmed to the control device 108 by a "Subscription Acknowledge" message, in this case by the confirmation message 116. By subscribing, the control device 108 knows that the now taught sensor 106 is connected and active in the communication network 102.

Figure 6:
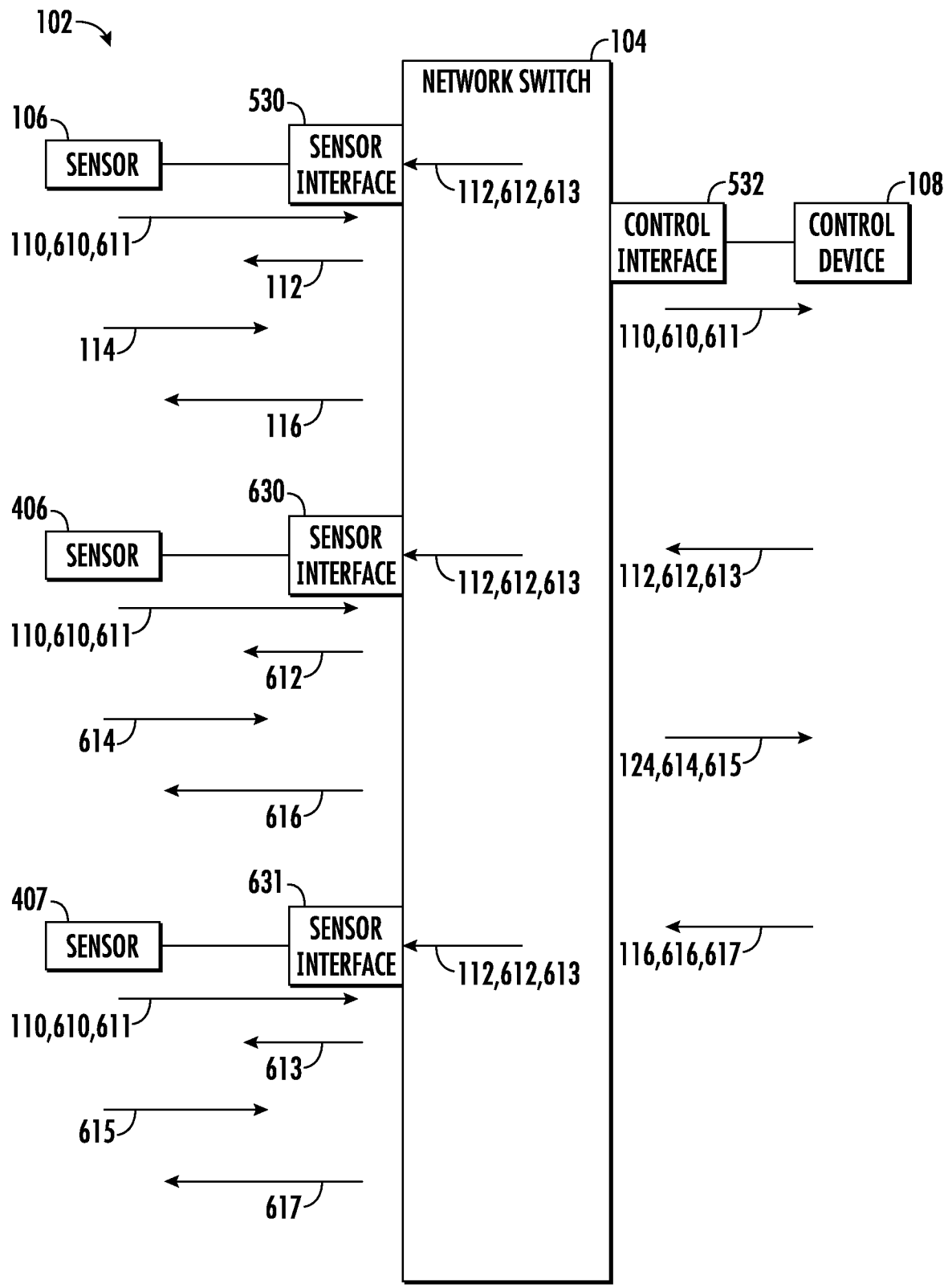
FIG. 6 is a block diagram of a communication network according to one embodiment.

FIG. 6 is a block diagram of a communication network according to one embodiment. This can be an embodiment of the communication network described with reference to FIG. 4.

The communication network 102 comprises the first sensor 106, the second sensor 406, the third sensor 407, the network switch 104, and the control device 108. In addition to the first sensor interface 530, for example port 1, for connecting the first sensor 106, the network switch 104 comprises a second sensor interface 630, for example port 2, for connecting the second sensor 406, and a third sensor interface 631, for example port 3, for connecting the third sensor 407. The network switch 104 is in turn designed as a switch, and the control device 108 as a control unit.

According to this embodiment, a communication principle comprising the plurality of sensors 106, 406, 407 comprises a first service search query 110, which is also referred to as Find Service "Var_1", a second service search query 610, also referred to as Find Service "Var_2", a third service search query 611, which is also referred to as Find Service "Var_3". The three service search queries 110, 610, 611 are transmitted by all three sensors 106, 406, 407 so that the control device 108 receives the three service search queries 110, 610, 611 from all sensors 106, 406, 407.

Furthermore, the communication principle comprises a first service provision message 112, also referred to as Offer Service "Var_1", a second service provision message 612, also referred to as Offer Service "Var_2", and a third service provision message 613, also referred to as Offer Service "Var_3". The three service provision messages 112, 612, 613 are transmitted by the control device 108 to all sensors 106, 406, 407. According to one embodiment, the sensor interfaces 530, 630, 631 are designed to filter the data frames of the service provision messages 112, 612, 613. The different service provision messages 112, 612, 613 have different data frames. Thus, each service provision message 112, 612, 613 can be identified via its specific data frame. The different service provision messages 112, 612, 613 can each bring about a different configuration of the sensors 106, 406, 407. Thus, the first sensor 106 can learn a first configuration by using the first service provision message 112, the second sensor 406 can learn a second configuration by using the second service provision message 612, and the third sensor 407 can learn a third configuration by using the third service provision message 613. Via the interface configuration of the sensor interfaces 530, 630, 631, a service provision message 112, 612, 613 provided for the corresponding sensor 106, 406, 407 can be selected for each of the sensors 106, 406, 407 on the basis of its specific data frame. According to this embodiment, a corresponding selection rule is stored in the form of filter rules in the sensor interfaces 530, 630, 631. According to this embodiment, the first sensor interface 530 is designed to allow only the first service provision message 112 to pass through and to block the other service provision messages 612, 613 by filtering the data frames, the second sensor interface 630 is designed to allow only the second service provision message 612 to pass through and to block the other service provision messages 112, 613 by filtering the data frames, and the third sensor interface 631 is designed to allow only the third service provision message 613 to pass through and to block the other service information messages 112, 612 by filtering the data frames.

Furthermore, the communication principle comprises a first subscription message 114 provided by the first sensor 106, which is also referred to as Subscribe Service "Var_1", a second subscription message 614 provided by the second sensor 406, which is also referred to as Subscribe Service "Var_2", and a third subscription message 615 provided by the third sensor 407, which is also referred to as Subscribe Service "Var_3". The control device 108 receives the subscription messages 114, 614, 615 from the sensors 106, 406, 407.

Furthermore, the communication principle comprises a first confirmation message 116, which is also referred to as Subscribe Ack Service "Var_1", a second confirmation message 616, which is also referred to as Subscribe Ack Service "Var_2", and a third confirmation message 617, which is also referred to as Subscribe Ack Service "Var_3". The three confirmation messages 116, 616, 617 are transmitted by the control device 108. The first sensor 106 receives the first confirmation message 116, the second sensor 406 receives the second confirmation message 616, and the third sensor 407 receives the third confirmation message 617.

With reference to FIG. 6, the communication with the plurality of sensors 106, 406, 407 is described below.

According to one embodiment, the control device 108, in this case in the form of a teaching control unit, transmits an "Offer Service" message, here the service provision messages 112, 612, 613, for each sensor variant. The sensors 106, 406, 407, which are in the not yet taught state, also transmit a "Find Service" for each possible variant, here the service search queries 110, 610, 611. In other words, in the case of the three sensors 106, 406, 407, the control device 108 offers three Some/IP services, i.e., three "Offer Service" messages are transmitted from the control device 108, and 3 "Find Service" are transmitted from each sensor 106, 406, 407.

Each sensor 106, 406, 407 recognizes its variant on the basis of which "Offer Service" it sees in the network. In order for each sensor 106, 406, 407 to learn its variant, it must obtain exactly one valid "Offer Service" from the control device 108. In order to be able to ensure this, at the network switch 106, the packet filter is configured at the relevant sensor interface 530, 630, 631, at which the sensors 106, 406, 407 are attached, such that the relevant sensor interface 530, 630, 631 always allows only one specific "Offer Service" to pass through in the direction of the sensor 106, 406, 407. As a result, the port filter configuration, i.e., the configuration of the sensor interface 530, 630, 631 in the network switch 104, determines how the sensors 106, 406, 407 are to be coded. The sensor interfaces 530, 630, 631 are designed here as Ethernet switch ports. The codings of the sensors 106, 406, 407 are determined indirectly via the Ethernet switch port configuration.

If a sensor 106, 406, 407 has been successfully taught, according to one embodiment, the sensor 106, 406, 407 detects its variant setting, i.e., its configuration. When the sensor software is next started, the variant is known and the corresponding functionality is set for operation. The sensor 106, 406, 407 again transmits all known "Find Service" messages and the control device 108 also transmits the "Offer Service" messages so that all sensors 106, 406, 407 can log on to the control device 108 by a subscription of the corresponding service. As a result, the control device 108 always knows which sensors 106, 406, 407 are connected and actively participate in the network, or it is possible to detect, on the control unit side, when sensors 106, 406, 407 are missing or incorrectly connected. Each of the sensors 106, 406, 407 can also determine if it is connected in a manner differently from that taught (by an unexpected "Offer Service" message). This can be very helpful in the case of troubleshooting in the workshop or during production.

In order that other communication channels in the communication network 102 are not disturbed, according to one embodiment a separate VLAN (Virtual LAN) is created for this teaching mechanism.

Even when selecting the network switch 104 in the form of a switch, care is accordingly taken to ensure that the network switch 104 can operate with extended port filter properties. For example, the network switch 104 has the functionality that filter criteria for the first 96 bytes (or more) of the Ethernet frames are applied, so that the Some/IP "Offer Service" messages, i.e., the service provision messages 112, 612, 613, can be filtered at the sensor interfaces 530, 630, 631. Modern switches already support such functions.

This approach is suitable, for example, in automated driving, in which very many sensors 106, 406, 407 are connected via the network switch 104 in the form of an Ethernet switch. The continuous teaching of these sensors 106, 406, 407 can thus be carried out without great technical challenge.

Figure 7:
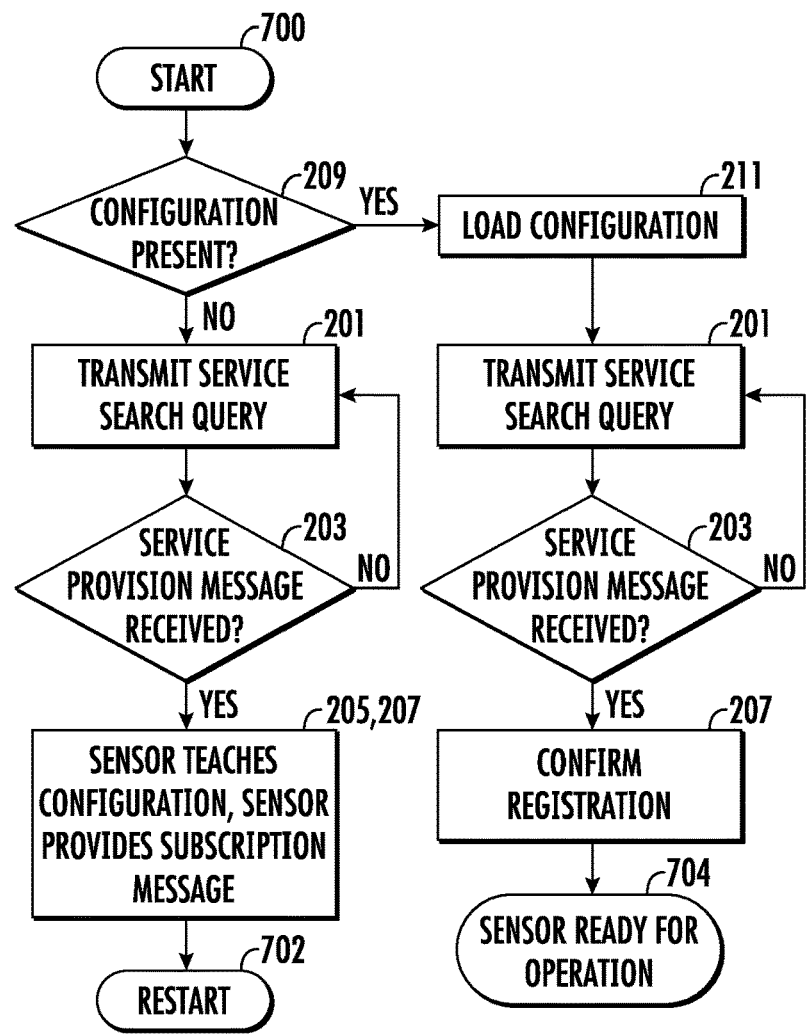
FIG. 7 is a sequence diagram for teaching a sensor for a vehicle according to one embodiment.

FIG. 7 is a sequence diagram for teaching a sensor for a vehicle according to one embodiment. In this case, it is possible to teach the software of a sensor, which is part of a communication network, as is described with reference to the preceding figures.

After a start 700, it is checked, in a step 209, whether a configuration is already present, i.e., for example a variant has already been taught. A variant is also referred to as a configuration option. If this is not the case, in a step 201, all the service search queries that can be transmitted by this sensor are transmitted, i.e., for example the Find Service messages described with reference to FIG. 6 are transmitted. If no service provision message is then received in a step 203, step 201 is carried out again. If, in contrast, a service provision message is received in step 203, i.e., if a check on a received Offer Service message is positive, the sensor learns, in a step 205, by using the service provision message, and confirms the registration of the service offered by the service provision message in a step 207. In a step 702, the method is restarted.

If it is detected in step 209 that a configuration is already present, i.e., for example a variant has already been taught, the configuration or variant corresponding to the configuration present is loaded in a step 211. Subsequently, in a step 201, all of the service search queries that can be transmitted by this sensor are transmitted, i.e., for example the Find Service messages described with reference to FIG. 6 are transmitted. If no service provision message is then received in a step 203, step 201 is carried out again. If, in contrast, a service provision message is received in step 203, i.e., if a check on a received Offer Service message is positive, the sensor confirms the registration of the service offered by the service provision message in a step 207. In a step 704, the sensor is ready for operation.

Figure 8:
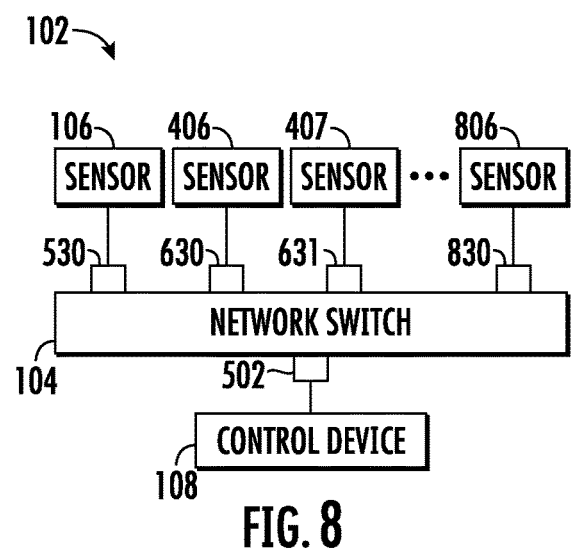
FIG. 8 is a block diagram of a communication network according to one embodiment.

FIG. 8 is a block diagram of a communication network 102 according to one embodiment. This can be an embodiment of the communication network described with reference to FIG. 6, at least one further sensor 806 being connected to the network switch 104 via at least one further sensor interface 830.

According to one embodiment, the sensors 106, 406, 407, 806 comprise software which tests, in the untaught state, the variants with which the relevant sensor 106, 406, 407, 806 can establish successful communication, as is shown on the basis of the sequence diagram shown below with reference to FIG. 9. Successful communication is characterized, for example, by the receipt of a service provision message.

According to one embodiment, the sensor interfaces 530, 630, 631, 830 are configured in the form of ports for special communication with particular MAC/IP addresses and VLAN. As a result, each of the sensor interfaces 530, 630, 631, 830 allows only one particular service provision message to pass through, which is detected by the respective sensor interfaces 530, 630, 631, 830, for example on the basis of a frame contained in the service provision message, also referred to as a framework. All other service provision messages are filtered out by this sensor interface 530, 630, 631, 830.

According to one embodiment, the sensor interfaces 530, 630, 631, 830, also referred to as ports, are configured on the network switch 104, also referred to as the Ethernet switch, such that it only allows a certain type of communication per sensor interface 530, 630, 631, 830: communication via a specific VLAN (Virtual LAN) with a subscriber in the form of one of the sensors 106, 406, 407, 806, which has a certain Ethernet MAC address and IP address.

The software of one of the sensors 106, 406, 407, 806 knows all possible variants that can be selected for the sensors 106, 406, 407, 806 via coding. In the untaught state of the relevant sensor 106, 406, 407, 806, the software successively attempts, with each known variant, to establish communication to the control device 108 in the form of a control unit. If communication with the control device 108 occurs, the variant to be selected is identified and the relevant sensor 106, 406, 407, 806 learns this variant and the coding of the variant is thus completed. The coding of the sensors 106, 406, 407, 806 is thus determined indirectly via the Ethernet switch port configuration, i.e., the configuration of the sensor interfaces 530, 630, 631, 830. In order to configure the sensor interfaces 530, 630, 631, 830, a suitable filter rule is set, for example, at each of the sensor interfaces 530, 630, 631, 830. This can take place, for example, once, before or during a start-up of communication network 102, or during a change to the communication network 102, for example when one or more additional sensors are integrated. In this case, according to one embodiment the filter rules are adjusted to a data format of the service provision messages. For example, the filter rules are suitable for filtering information contained in a predetermined frame of the service provision messages, by means of which information it is possible to unambiguously determine the sensor for which a specific service provision message is intended. It is thus possible to define in advance, by means of the filter rules, which of all possible service provision messages is allowed to pass through at which sensor, and at which sensors the corresponding service provision message is not allowed to pass through.

Figure 9:
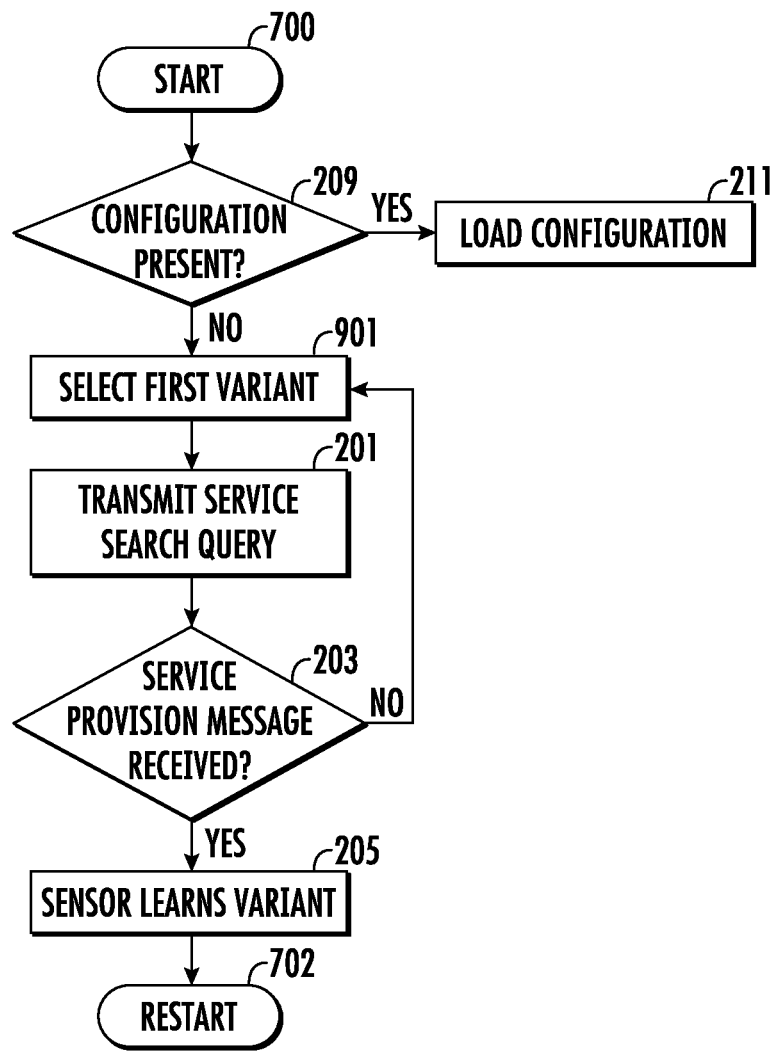
FIG. 9 is a sequence diagram for teaching a sensor for a vehicle according to one embodiment.

FIG. 9 is a sequence diagram for teaching a sensor for a vehicle according to one embodiment. In this case, it is possible to teach the software of a sensor, which is part of a communication network, as is described with reference to the preceding figures.

After a start 700, it is checked in a step 209 whether a configuration is already present, i.e., for example a variant has already been taught.

If it is detected in step 209 that a configuration is already present, i.e., for example a variant has already been taught, the variant is loaded, i.e., started, in a step 211.

If, in contrast, it is detected in step 209 that no variant has been taught, a first possible variant is selected in a step 901 and, in a step 201, a service search query associated with this variant is transmitted by establishing suitable communication. If no service provision message is subsequently received in a step 203, i.e., no communication is established, steps 901, 201 are carried out again, using a next possible variant. If, in contrast, a service provision message is received in step 203, i.e., if communication has been established, the sensor learns, in a step 205, the current variant for which the communication has been established. In a step 702, the method is restarted.

The invention claimed is:

1. A method for coupling a sensor for a vehicle to a control device via a network switch, the method comprising:
transmitting at least one service search query from the sensor to a sensor interface of the network switch;
receiving a service provision message from the sensor interface of the network switch with the sensor, the service provision message representing a message provided by the control device to a control interface of the network switch for configuring the sensor;
teaching a configuration of the sensor by using the service provision message; and
providing a subscription message from the sensor that confirms the configuration to the sensor interface of the network switch,
wherein the transmitting of the at least one service search query includes transmitting a plurality of service search queries associated with different configuration options of the sensor.

2. The method according to claim 1, further comprising:
checking whether a configuration is present,
wherein the transmitting of the at least one service search query is performed if no configuration is detected.

3. The method according to claim 2, further comprising:
loading the configuration, wherein the loading and the transmitting of the at least one service search query are performed if the configuration is detected as being present in the checking whether the configuration is present.

4. The method according to claim 3, wherein:
the receiving of the service provision message is performed after the transmitting of the at least one service search query,
the providing of the subscription message that confirms the configuration is performed in response to the configuration corresponding to the service provision message, and
the teaching of the configuration of the sensor is performed by using the service provision message in response to the configuration not corresponding to the service provision message.

5. The method according to claim 1, wherein a computer program is configured to carry out and/or actuate the method.

6. The method according to claim 5, wherein the computer program is stored on a non-transitory machine-readable storage medium.

7. The method according to claim 1, wherein the different configuration options of the sensor include a measurement range of the sensor.

8. The method according to claim 1, further comprising:
filtering the service provision message at each sensor interface of the network switch.

9. A method for coupling a sensor for a vehicle to a control device via a network switch, the method comprising:
transmitting a plurality of service search queries from the sensor to a sensor interface of the network switch, each service search query of the plurality of service search queries associated with a different configuration option of the sensor;
transmitting at least one service provision message from the control device to a control interface of the network switch, the service provision message representing a message for configuring the sensor; and
outputting the service provision message at the sensor interface of the network switch that is associated with the service provision message.

10. The method according to claim 9, wherein the transmitting of the at least one service provision message includes transmitting a plurality of service provision messages associated with the different configuration options of the sensor.

11. The method according to claim 9, wherein transmitting of the at least one service provision message is performed in response to a start-up of the control device or in response to the control device receiving the plurality of service search queries.

12. The method according to claim 9, further comprising:
returning a subscription message that confirms a configuration of the sensor from the sensor interface to the control interface of the network switch.

13. The method according to claim 9, wherein, in the outputting of the service provision message, the sensor interface is selected from a plurality of sensor interfaces by using the service provision message.

14. A communication network for a vehicle, the communication network comprising:
a control device;
a network switch; and
at least one sensor;
wherein the control device is configured to transmit at least one service provision message to a control interface of the network switch, the service provision message representing a message for configuring a sensor, wherein the network switch is configured to guide the service provision message from the control interface to a sensor interface of the network switch that is associated with the service provision message, wherein the sensor is configured to transmit at least one service search query to the sensor interface of the network switch, to receive the service provision message from the sensor interface, to teach a configuration of the sensor by using the service provision message, and to provide the sensor interface of the network switch with a subscription message that confirms the configuration, and wherein the transmitting of the at least one service search query includes transmitting a plurality of service search queries associated with different configuration options of the sensor.

15. The communication network according to claim 14, wherein:

the sensor is configured to sense a physical quantity after teaching the configuration, and to provide a sensor signal representing the physical quantity, and the communication network comprises a further control device configured to receive the sensor signal and to control a vehicle function of the vehicle by using the sensor signal.

16. The communication network according to claim 14, wherein the communication network is configured as an Ethernet network.

* * * * *